Jan. 3, 1928.　　　　　　　　　　　　　　　1,654,672
J. F. WHITE
ANIMAL RACING APPLIANCE
Filed Oct. 23, 1926　　　　2 Sheets-Sheet 1
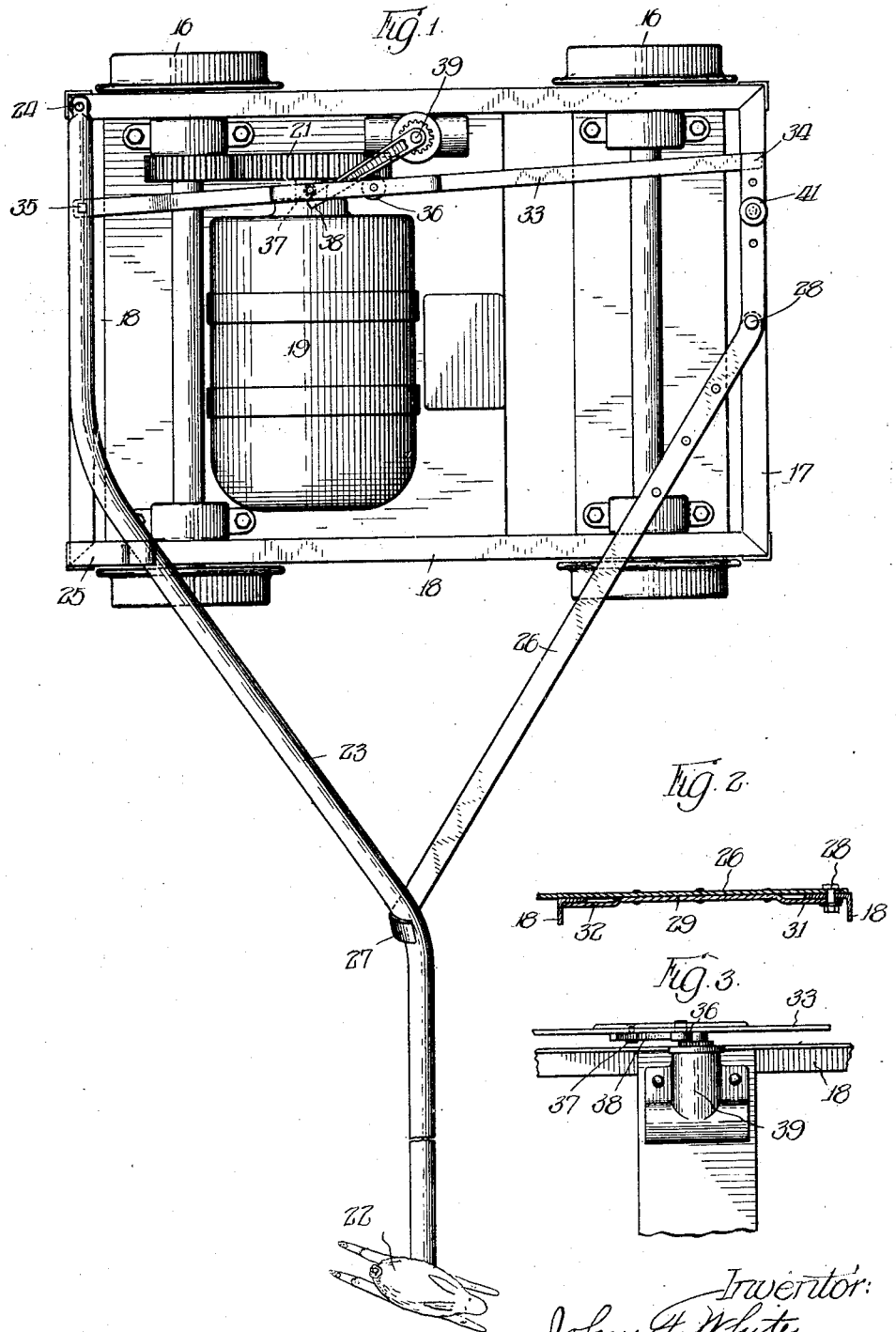

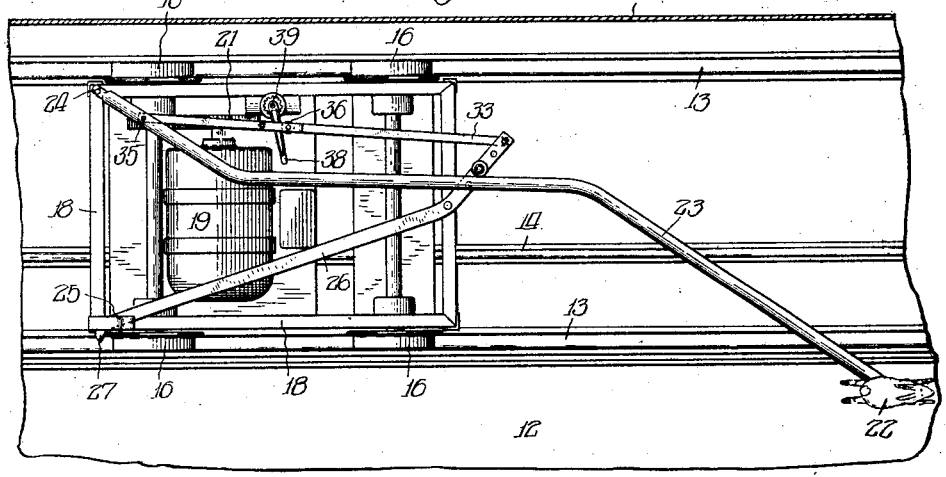
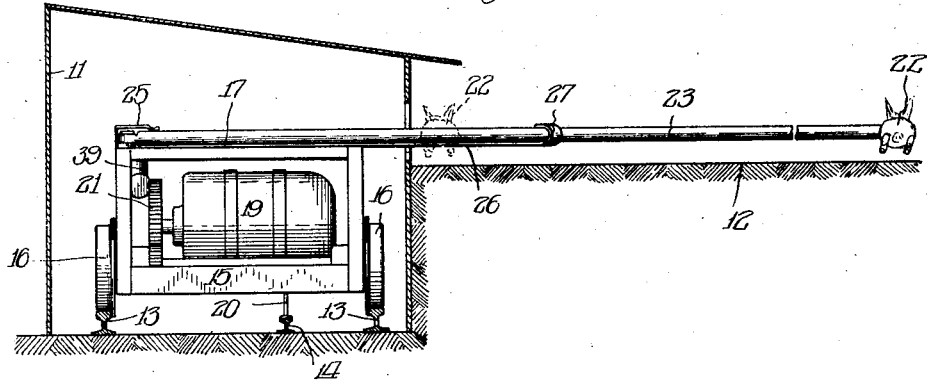
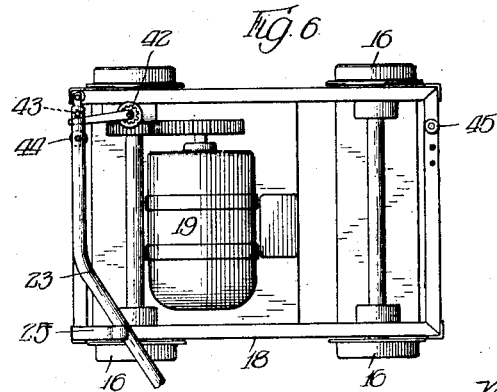

Patented Jan. 3, 1928.

1,654,672

UNITED STATES PATENT OFFICE.

JOHN F. WHITE, OF CHICAGO, ILLINOIS.

ANIMAL-RACING APPLIANCE.

Application filed October 23, 1926. Serial No. 143,532.

My invention concerns betterments and structural and functional advantages in a novel style of lure-operating mechanism to be used in association with a race-track whereon the racing animals, such as dogs, are incited or prompted to race by reason of the rapidly traveling lure in front of them.

At the termination of the race, it is desirable to have the decoy, such as an artificial or partly natural rabbit disappear out of the sight of the racing dogs and the present invention supplies improved means to that end.

One object of the invention is to provide a construction of this character which will permit the operator to cause the tempting bait to vanish at any point along the race-track, so that he has full control of the racing animals in so far as the movements of the enticing lure are concerned.

Other purposes of the invention will be made apparent to those skilled in this art from a consideration of the present desirable and preferred embodiments of the invention described in detail below and illustrated in like manner in the accompanying drawings, forming a part of this specification and throughout the several views of which like reference numerals have been employed to designate the same structural parts.

In these drawings:

Figure 1 is a plan view of the truck, car, or carriage on which the lure is mounted in such a manner that it may travel over the race-track as a tempting bait for the dogs or may be retracted into inoperative or invisible position;

Figure 2 is a fragmentary vertical section on line 2—2 of Figure 1;

Figure 3 illustrates the lure arm checking device;

Figure 4 shows the same car on its trackway adjacent to or alongside of the race-track and depicts the rabbit lure as retracted into a position close to the side-wall of the housing accommodating the car and the rails on which it travels;

Figure 5 is a cross-section of the structure depicted in Figure 4 showing the lure in operative position over the race-track in full lines and indicating its retracted or inoperative position in dotted lines; and Figure 6 illustrates a modified structure in fragmentary plan.

Referring to Figures 1, 4 and 5 of these drawings, it will be perceived that the usual housing 11 positioned by the side of the race-course 12 encloses the depressed rails 13, 13 and an intermediate third rail 14, a truck, carriage or car 15 having the flanged carrying-wheels 16, 16 being adapted to travel on the rails.

Such car may be of any suitable or appropriate construction and may include a top, rectangular frame 17, formed of angle bars 18, 18, the car having a driving electric-motor 19 properly electrically connected in well-known manner to a shoe or contact 20 designed to ride or slide on the third rail and to the carrying-wheels, so that an operator at any point, by proper switch means, may control the movement or travel of the car and the stopping of the same, the electric-motor, as is usual, being geared at 21 to one of the car axles to perform its car-driving operation.

The car is constructed, in any convenient way, so that it may be stopped suddenly or have its forward travel retarded rapidly as by the use of appropriate electrical governing means which are well-known.

The lure or decoy 22, such as an artificial or stuffed rabbit, is mounted on the end of a tubular, bent arm 23 fulcrumed on the car-frame at 24 at one rear corner, so that as the car travels forwardly, the arm will naturally swing outwardly and rearwardly, due to its inertia, until it engages a fixed stop 25 on the car-frame, in which position of the arm, its rabbit will be correctly located over the racing trackway.

A bent lever 26, having a hook end 27 designed in the extended condition of the decoy-supporting arm 23 to bear against the rear side of the latter to relieve it of strain and to reduce its vibration, is fulcrumed on the car-frame at 28, and, in order to strengthen the structure and decrease the jarring of such lever, it has a bar 29 (Figure 2) riveted to it with its one end 31 extended beneath one of the angle-bars 18 with the pivot or hinge pin 28 accommodated in registering holes in the three superposed parts, and with its other slightly-depressed end 32 slidingly fitting beneath the horizontal flange of another of the frame angle-bars 18 at that side of the car nearest the race-track.

A link 33 is pivotally connected at 34 to one arm of the lever 26 and at 35 to the rabbit-supporting arm 23, such link being equipped on its under side with a pair of spaced rollers 36 and 37 between which is located the outstanding arm 38 of a combined spring and oil check appliance 39 like those commonly used with doors which tends to shift the link 33 to the right, but which is prevented from doing so as long as the parts occupy the positions and relations presented in Figure 1 because of the small component of the force applied to the link acting in the direction specified and which is inadequate to move the several connected elements of the mechanism.

A stop or abutment roller 41 is adjustably mounted on the forward cross-bar of the car-frame, its supporting pin being adapted to be inserted in any one of several holes, as illustrated, to modify the position which the lure-arm will occupy when it is swung in as far as permitted by such stop.

The appliance functions practically as follows:

Assuming that the operator is causing the car to travel forwardly, that is to the right as the device is shown in Figures 1 and 4, at a proper speed, the arm 23 will be automatically maintained in its outstanding position and its complementary supporting arm or lever 26 will be acting to sustain it in such relation.

Under these conditions, the decoy rabbit will travel along the race-track at a sufficient speed to be kept a proper distance ahead of the oncoming racing dogs which are seeking to reach it.

When it is desired that the lure shall be withdrawn or caused to disappear, the operator suddenly stops the car, causing the arm 23, owing to its momentum, to swing forwardly around its hinge or fulcrum 24, and, through the mechanical connection shown, effecting the reverse inward turning of lever 26 around its fulcrum 28.

During such movement of the parts, the arm 38 swings around and the appliance 39 acts as a check or dampener assuring that the inturning or infolding of the interconnected elements will not result in their injury by reason of a too-sudden stopping of their movements.

Thus the arm 23 swings inwardly against the stop-roller 41 and its lure or decoy rabbit is carried in close to the housing or inside of the latter depending upon the adjusted position of the roller, it being understood that, if the rabbit is to enter the side of the housing, a sufficiently-wide slot therein must be provided for that purpose, although it may be wholly or partly covered by a drapery to conceal the rabbit after such entry.

In some cases, however, it is sufficient to bring the decoy in close to the outside of the housing, where it is more or less concealed by the shadow under the eave.

The check device 39 prevents the parts from slamming in at an undue speed, but it also assures that they will be fully retracted just as the door-check makes certain that the open door will close fully although restrictedly and restrainedly as to speed.

In some instances, the construction may be considerably simplified as depicted in the modified form of appliance presented in Figure 6.

In this structure, the parts 26 and 33 are omitted and the combined spring and check device 42 acts directly on the decoy-carrying arm 23 between two rollers 43 and 44.

Such member 42 does not begin to act effectively on the lever 23, owing to the angular relation between them, until the element 23 has moved forwardly a substantial amount upon stopping the car and then it functions as a check and as a restrained spring to insure the complete inward travel of the arm until it strikes a stop or abutment roller 45 adjustably mounted on the frame 17 to determine whether the rabbit shall move inwardly into the housing or merely up to its outside as in the previous instance.

Those acquainted with this art will readily understand that the invention is not limited to these particular embodiments but is susceptible of incorporation in physical forms varying greatly as to their mechanical structures.

I claim:

1. In an appliance of the character described, the combination of a carrier adapted to travel, an arm hinged thereon adapted to outstand therefrom and to swing forwardly from such outstanding position under the action of its momentum when the forward speed of the carrier is substantially reduced, a one-way stop to prevent rearward swinging only of said arm, and a lure mounted on said arm.

2. In an appliance of the character described, the combination of a carrier adapted to travel, an arm hinged thereon adapted to outstand therefrom and to swing forwardly from such outstanding position under the action of its momentum when the forward speed of the carrier is substantially reduced, means to yieldingly resist such forward turning of the arm upon retardation of the travel of said carrier, a one-way stop to prevent rearward swinging only of said arm, and a lure mounted on said arm.

3. In an appliance of the character described, the combination of a carrier adapted to travel, an arm hinged thereon adapted to outstand therefrom and to swing forwardly from such outstanding position under the action of its momentum when the forward speed of the carrier is substantially reduced, means to yieldingly resist such forward movement of the arm and to assure completion of such movement upon substantial retardation of the travel of said carrier, a one-way stop to prevent rearward swinging only of said arm, and a lure mounted on said arm.

4. In an appliance of the character described, the combination of a carrier adapted to travel, an arm hinged thereon designed to outstand therefrom and to swing forwardly from such outstanding position under the action of its momentum when the forward speed of the carrier is substantially reduced, means extended beyond the carrier to assist in the support of said arm in its outstanding position, means to cause said arm-supporting means to move inwardly toward the carrier when said arm swings inwardly, a one-way stop to prevent rearward swinging only of said arm, and a lure on said arm.

5. In an appliance of the character described, the combination of a carrier adapted to travel, an arm hinged thereon designed to outstand therefrom and to swing forwardly from such outstanding position under the action of its momentum when the forward speed of the carrier is substantially reduced, a second arm hinged on said carrier and adapted when extended to assist in the support of said first arm in its outstanding position and designed to swing rearwardly toward the carrier when said first arm swings forwardly, means operatively connecting said arms together to cause said arms to swing in opposite directions substantially simultaneously, and a lure on said arm.

In witness whereof I have hereunto set my hand.

JOHN F. WHITE.